Patented Oct. 12, 1937

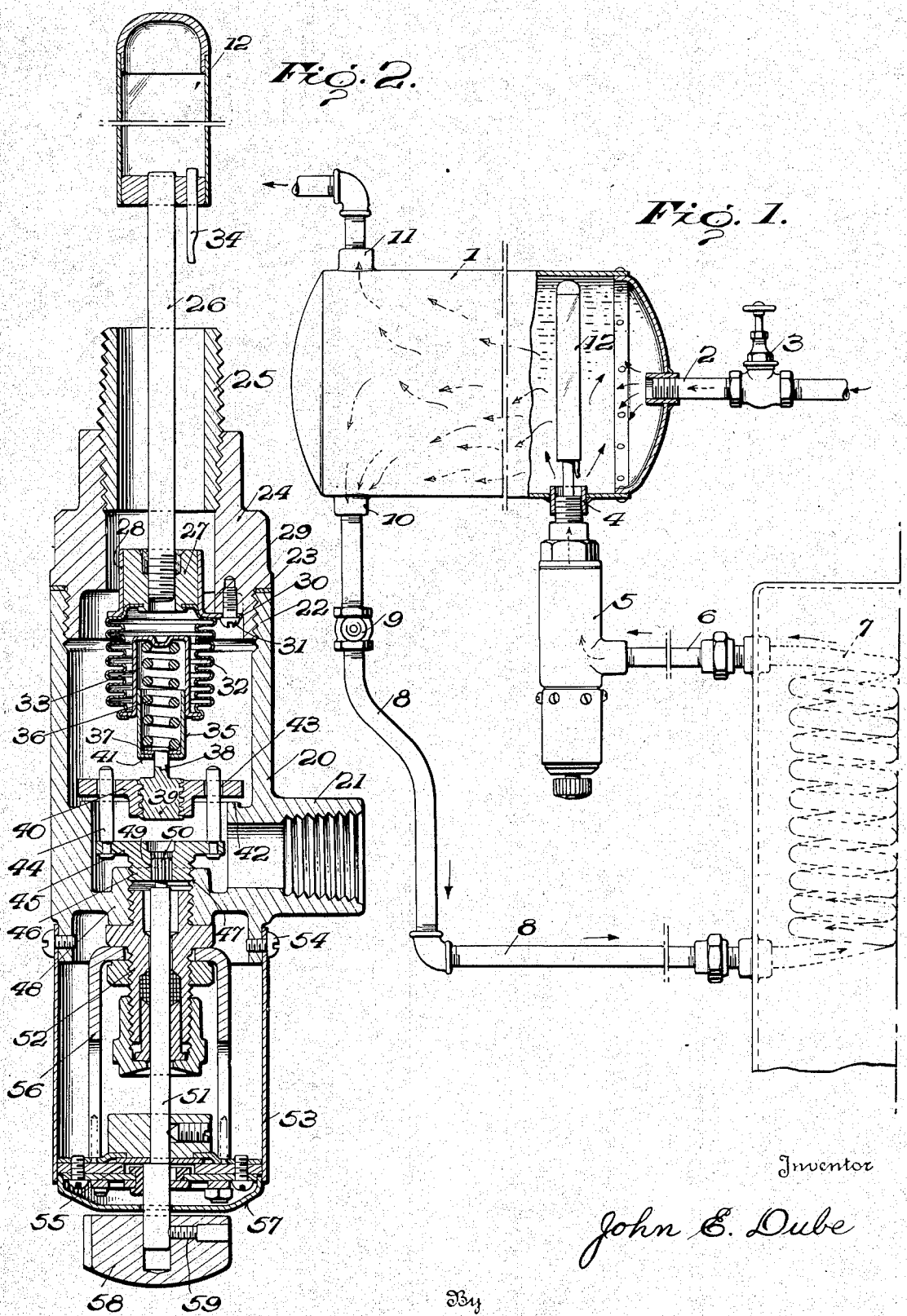

2,095,357

UNITED STATES PATENT OFFICE 2,095,357

WATER HEATER AND CONTROL THEREFOR

John E. Dube, Knoxville, Tenn., assignor to The Fulton Sylphon Company, Knoxville, Tenn., a corporation of Delaware Application July 9, 1934, Serial No. 734,341

10 Claims. (Cl. 236—20)

This invention relates to water heaters and controls therefor.

It is an object of this invention to provide a water heater with a storage tank wherein the water connections thereto are so related that stratification of the water in the tank is substantially prevented and substantial uniformity of temperature is obtained throughout the tank.

Another object of this invention is to provide a water heater with a storage tank having automatic means for regulating the temperature of the water therein and which is so related to the water connections to the tank that the regulator is quickly responsive to the admission of cold water and a substantially uniform temperature is thereby maintained.

Another object of this invention is to provide a water heater with a storage tank having automatic means for regulating the temperature therein and wherein said regulating means is of improved construction, being simple and compact in structure, sensitive and efficient in operation and readily adjustable to predetermine the temperature to be maintained in said tank.

Other objects of the invention will appear as the description thereof proceeds.

The invention is capable of receiving a variety of mechanical expressions, one of which is shown on the accompanying drawing, but it is to be expressly understood that the drawing is for purposes of illustration only, and is not to be construed as a definition of the limits of the invention, reference being had to the appended claims for that purpose.

In said drawing:—

Fig. 1 is a somewhat schematic view illustrating a water heater provided with a storage tank wherein the water connections and regulating means are so related as to embody the principles of the present invention; and Fig. 2 is an enlarged axial section of the regulating means of the present invention.

Referring first to Fig. 1, the embodiment of the invention as here shown includes a storage tank 1 of any suitable size, construction and material, but shown as a generally cylindrical tank with its axis substantially horizontal as preferred. Communicating with the interior of said tank at one end thereof and preferably in approximately the axis of the tank is a cold water inlet pipe 2, which may be provided with a manually-operated shut-off valve 3. Disposed adjacent the same end of the tank but in the side thereof is a hot water inlet 4 so arranged with respect to the cold water inlet 2 that their deliveries are relatively adjacent but at right angles to each other. Hot water is supplied to the inlet 4 through a regulator generally designated 5 and piping 6 leading from a coil 7 subjected to any suitable source of heat. Coil 7 communicates with pipe 8, which may also include a hand-operated shut-off valve 9, pipe 8 being shown as leading from a water outlet 10 disposed on the same side of the tank as the inlet 4 but adjacent the opposite end of the tank. A hot water outlet 11 is in communication with the tank 1 at the end of the tank opposite the cold water inlet 2, and is preferably disposed at the side of said tank which is opposite the inlet 4.

As hereinafter described more in detail, the regulator generally designated 5 is provided with a thermostatic bulb 12 which projects into the interior of the tank 1 and preferably extends for a major portion of the diameter thereof, so that said bulb lies across the path of the cold water entering through the inlet 2. Said bulb is disposed relatively close to said inlet 2 so that it can respond quickly to the drop in temperature accompanying any admission of cold water to the tank 1.

Hot water entering the tank 1 through the inlet 4 therefore flows at substantially right angles to the cold water entering through the inlet 2, with the result that the two streams of hot and cold water are caused to intimately intermix as indicated by the arrows on the drawing and thereby stratification of the hot and cold water in the tank 1 is substantially prevented. This intimate intermingling of the two streams of water will occur whether the current is mainly to the outlet 10 for circulation through the pipe 8 and coil 7, back through the pipe 6 and regulator 5 to inlet 4, or whether the main circulation is toward the hot water outlet 11 because water is being withdrawn from the tank. At the same time, the regulator for determining the circulation of the water through the piping 8, coil 7 and pipe 6 is under the control of the bulb 12 which is across the path of the entering cold water and relatively close to the cold water inlet, so that immediately that hot water is withdrawn from the outlet 11 so that cold water enters through the inlet 2 said bulb 12 actuates the regulator 5 to initiate or increase the circulation of hot water from the coil 7 to the inlet 4. Hence the admission of hot water is initiated or increased before the temperature of the water in the tank 1 has had an opportunity to be materially decreased.

Whether the water is flowing from the tank 1 through the outlet 10 or the outlet 11, the hot water entering the tank through the inlet 4 must traverse substantially the entire body of water in the tank 1, both transversely and lengthwise with respect thereto, so that before the water reaches the outlet the hot water has been intimately intermingled with the cold water to produce substantial uniformity in the temperature throughout the transverse section of the tank. Hence by reason of the construction disclosed stratification is substantially prevented, substantial uniformity of temperature throughout the tank is obtained, and inasmuch as the bulb 12 of the regulator responds immediately to the admission of cold water, this substantial uniformity of temperature is maintained even though hot water is being withdrawn through the outlet 11.

Referring now to Fig. 2, a preferred form of the regulator 5 is illustrated by an enlarged axial section. As shown, said regulator includes a valve casing 20 provided with an inlet nipple 21, here shown as threaded for attachment of the pipe leading from the coil heretofore referred to, although any other suitable form of coupling may be employed. At one end said casing 20 is threaded as shown at 22 and attached thereto, preferably with an interposed gasket 23, is a bonnet member 24, also interiorly threaded for reception of a coupling member 25 for the connection to the hot water inlet 4 heretofore referred to, although any other suitable form of coupling or connection may be employed if preferred.

The bulb 12 of the thermostat heretofore referred to, and which may be of any suitable size, construction and character, is connected to a tube or pipe 26 which is attached to said bulb 12 in any suitable way. Said tube or pipe at its opposite end is suitably attached to a plug 27 mounted within the tubular portion 28 of a spider or bracket 29 having one or more radially projecting lugs 30 by which said spider or bracket and plug are mounted within or on the bonnet member 24, as by screws 31. Suitably attached to the plug 27 is the stationary end wall of an expansible and collapsible chamber here shown as in the form of a deeply corrugated tubular metal member or bellows 32 which at its stationary end may be soldered or brazed to said plug 27 or the spider or bracket 29, and which at its opposite or movable end has formed integrally therewith or suitably attached thereto as by soldering or brazing a reentrant movable end wall 33. The expansible and collapsible chamber 32 is thus in communication through said tube or pipe 26 with the bulb 12, and said bulb 12, tube or pipe 26 and expansible and collapsible chamber 32 are completely filled with an expansible liquid, a suitable filling opening being provided as by the pipe 34.

Suitably attached to the reentrant end wall 33, as by soldering or brazing, is a tubular member 35 which provides with the end wall 33 a chamber in which is received a coil spring 36 which reacts between said end wall 33 and a plate 37 suitably attached to the stem 38 of a threaded plug 39 on which is mounted a valve disk 40. Stem 38 is non-circular in cross section, as by being flattened on one side, and passes through a correspondingly shaped aperture 41 in the end of the member 35, so that relative rotation between the plug 39 and the member 35 is prevented. Valve disk 40 cooperates with a valve seat 42 formed in or suitably attached to the valve casing 20 between the inlet 21 and the outlet 25 thereof.

Valve disk 40 is provided with a plurality of apertures 43 in which are loosely engaged a corresponding number of axially extending pins 44 attached in any suitable way to a disk 45 having a threaded hub 46 mounted in a threaded aperture 47 in the end wall 48 of the valve casing 20. Engaged in a central serrated aperture 49 of said hub 46 is a correspondingly serrated plug 50 on a stem 51 by which the disk 45 may be rotated to rotate the valve member 40 on its threaded plug 39 and thereby adjust its position relatively to the expansible and collapsible chamber 32 and the valve seat 42. Stem 51 extends through a packing gland 52 of any suitable construction, and also shown as mounted within the threaded opening 47, and said stem is rotatably mounted within a housing 53 attached to the valve casing in any suitable way, as by screws 54, and here shown as provided with a suitable stop mechanism 55 for predetermining the extent of rotation of the stem 51. Said stop mechanism is mounted in said housing 53 in any suitable way as by the bracket 56 supported on the packing gland 52, and the outer end of the stem 51 projects through the cover plate 57 of the housing 53 and is provided at its outer end with a hand grasp 58 suitably attached to the stem 51 as by the screw 59.

In operation, the hot water from the coil 7 flows through the inlet 21, past the valve member 40, through the housing 20 and the openings provided by the spider or bracket 29, and out through the connection 25 to the hot water inlet 4. This flow of hot water from the heating coil 7 continues until the temperature within the storage tank 1 has attained the predetermined degree. The expansible and collapsible chamber 32 and the tube or conduit 26 are always at the high temperature of the inflowing hot water but the bulb 12 is at the temperature of the water in the tank. As the temperature in said tank increases, the expansible liquid in the bulb 12, which is subjected to the temperature of the water in the tank 1 substantially throughout its diameter, expands so that the total volume of the expanded liquid in the bulb 12, tube or pipe 26 and expansible and collapsible chamber 32 is sufficient to cause said chamber 32 to move the valve disk 40 toward or into contact with its seat 42. During this movement the disk 41 is held against the end of the tubular member 35 by the spring 36, and the valve disk 40 therefore moves in unitary relationship with the end wall 33. If the volume in the thermostat composed of bulb 12, the tube or pipe 26 and vessel 32 should thereafter for any reason continue to expand, the end wall 33 can continue to move toward the valve member 40, the disk 37 remaining stationary and the spring 36 being compressed while the tubular member 35 slides axially along the stem 38 at the aperture 41. Thus continued expansion of the liquid within the thermostat will not cause injury to the expansible and collapsible vessel 32 or the other parts of the thermostat.

When the temperature in the tank 1 decreases, as when cold water enters the tank from the inlet 2, the volume of liquid in the bulb 12 is contracted and the expansible and collapsible vessel 32, by reason of its inherent resiliency or by reason of a spring cooperating therewith, contracts to lift the valve member 40 and admit hot water to the tank through valve casing 20, the extent of opening of the valve 40 being dependent upon the contraction of the liquid within the bulb 12, which in turn is responsive to the degree of temperature drop within the tank 1. Hence the valve 40 is moved toward and away from its seat to vary the admission of hot water from the coil 7 in precise conformity with the fluctuation of temperature in the tank 1 at the bulb 12 which responds to the temperature in the tank substantially throughout the cross section thereof.

To adjust the temperature of the water to be maintained within the tank 1, the extent to which the liquid within the bulb 12 must expand in order to close the valve 40 may be varied by rotating the hand grasp 58 which, through the stem 51, rotates the disk 45 and the pins 44 carried thereby so that the valve member 40 is rotated on its threaded plug 39, causing the valve member to approach toward or recede from its seat 42 by an amount determined by the pitch of the thread between the plug 39 and disk 40 and the extent to which the disk 40 is rotated. During rotation of the valve member 40 plug 39 is held against rotation by reason of the heretofore described cooperation between its stem 38 and the aperture in the tubular member 35. During rotation of the disk 45 its hub moves within the threaded aperture 47, and said disk also has some axial movement because of the pitch of the thread on the hub, but as the pins 44 project loosely through the apertures 43 the axial movement of the disk 45 has no effect upon the adjustment of the valve member 40. The stem 51 may be rotated to the extent permitted by the stop mechanism 55 and the serrated interconnection between said stem 51 and the hub 46 permits the stem 51 to be connected with the disk 45 in any one of a relatively large number of positions so as to initially predetermine the relationship of the stem 51 and the hub 46.

It will therefore be perceived that by the present invention a water heater has been provided wherein stratification of the hot and cold water within the tank is substantially prevented and wherein the temperature within the tank is closely regulated by an automatic regulator which responds immediately to the admission of cold water and which is sensitively responsive to the temperature within the tank substantially throughout the cross section thereof so that the amount of hot water admitted to the tank 1 is nicely adjusted to maintain the desired temperature within the storage tank 1.

It will also be perceived that by the present invention an automatic regulator has been provided which is simple and compact in construction, which can be installed within the hot water conduit with little consumption of space, and which is readily adjustable so as to vary and predetermine the temperature of the water within the tank. At the same time said regulator is sensitively responsive to fluctuations of temperature and highly efficient in maintaining the desired temperature within the storage tank.

While a preferred embodiment of the invention has been described with considerable particularity, it is to be expressly understood that the invention is not restricted thereto, as various other embodiments of the invention will now readily suggest themselves to those skilled in the art. While the invention has been illustrated as embodied in a known type of domestic water heater wherein the water is circulated from and to the tank through a heating coil, such is not essential as the invention may be embodied in water heaters which contain no provision for recirculation of the water and wherein the hot water is supplied to the tank 1 from any suitable source of heated water through the regulator 5. Changes may also be made in the details of construction, arrangement, proportion, etc., of parts, and certain features may be used without other features, without departing from the spirit of this invention. Reference is therefore to be had to the appended claims for a definition of the invention.

What is claimed is:

1. In a water heater, in combination with a storage tank, hot and cold water connections communicating therewith adjacent one end thereof and delivering water to the interior of said tank through and adjacent to right angularly related walls thereof so as to form in said tank two intersecting right angularly related streams, and hot water and recirculating water outlets communicating with said tank adjacent the opposite end of said tank from both of said connections whereby the hot and cold water streams are caused to intimately intermingle and traverse the length of the tank both axially and transversely before flowing from either of said outlets.

2. In a water heater, in combination with a storage tank, hot and cold water connections communicating with said tank adjacent one end thereof, one of said connections delivering axially of the tank at substantially the center line thereof, and the other of said connections delivering transversely of said tank adjacent said end thereof, both of said connections terminating within but adjacent the wall of said tank whereby the hot and cold water flow in intersecting streams at substantially right angles to each other and become intimately interminged, a hot water outlet disposed at the opposite end of said tank from said inlets and at the opposite side of said tank from said second named inlet, whereby the entering water must traverse the length of the tank, both axially and transversely in order to reach said outlet, and an outlet for recirculating the water disposed at the same end of said tank as said hot water outlet.

3. In a water heater, in combination with a storage tank, hot and cold water connections communicating with said tank adjacent one end thereof, one of said connections delivering axially of the tank at substantially the center line thereof, and the other of said connections delivering transversely of said tank adjacent said end thereof, both of said connections terminating within but adjacent the wall of said tank whereby the hot and cold water streams flow at substantially right angles to each other and become intimately intermingled, a hot water outlet disposed at the opposite end of said tank from said inlets and at the opposite side of said tank from said second named inlet, whereby the entering water must traverse the length of the tank both axially and transversely in order to reach said outlet, and an outlet from said tank for recirculating the water therein, said last named outlet being disposed at the same end of the tank as said hot water outlet but at the opposite side of said tank.

4. In a water heater, in combination with a storage tank having inlets for hot and cold water disposed adjacent one end thereof and delivering said hot and cold water in streams at substantially right angles to each other and a hot water outlet at the opposite end of said tank, thermostatic means for regulating the admission of hot water and including a temperature responsive member disposed in said tank adjacent the cold water inlet whereby admission of hot water is varied by the effect of the entering cold water impinging directly on said temperature responsive member.

5. In a water heater, in combination with a storage tank having inlets for hot and cold water disposed adjacent one end thereof and delivering said hot and cold water in streams at substantially right angles to each other, and a hot water outlet at the opposite end of said tank, thermostatic means for regulating the admission of hot water and including a temperature responsive member disposed in said tank adjacent the cold water inlet, said temperature responsive means extending transversely across the path of the entering cold water for a major portion of the transverse dimension of said tank.

6. In a water heater, in combination with a storage tank having inlets for hot and cold water disposed adjacent one end thereof and delivering said hot and cold water in streams at substantially right angles to each other and a hot water outlet at the opposite end of said tank, a thermostatically operated valve for regulating the admission of hot water and including a bulb subjected to the water in said tank, and a motor vessel communicating with said bulb and subjected to the hot water flowing to said tank, said bulb, vessel and the connections therebetween being charged with an expansible liquid.

7. In a water heater, in combination with a storage tank having inlets for hot and cold water disposed adjacent one end thereof and delivering said hot and cold water in streams at substantially right angles to each other and a hot water outlet at the opposite end of said tank, a thermostatically operated valve for regulating the admission of hot water to said tank, said valve including a casing through which the hot water flows to said tank, a valve member for varying the flow of hot water, a motor vessel operatively connected to said valve member and subjected to the temperature of said hot water, and a bulb disposed in said tank and communicating with said vessel, said bulb, vessel and connections therebetween being charged with an expansible liquid.

8. In a water heater regulator, in combination with a storage tank having inlets for hot and cold water disposed adjacent one end thereof and delivering said hot and cold water in streams at substantially right angles to each other and a hot water outlet at the opposite end of said tank, a valve casing having a valve seat therein, a valve member cooperating with said seat, an expansible and collapsible vessel operatively connected to said valve member, a tube connected to said vessel and extending exteriorly of said casing, and a bulb connected to said tube and subjected to said streams within said tank, said bulb, tube and vessel being charged with an expansible liquid and said vessel and tube being subjected to the hot water flowing through said casing whereby said liquid is maintained in its expanded condition in said vessel and tube by the hot water flowing through said casing and fluctuations of temperature at said bulb cause expansion and contraction of said liquid therein and sensitively effect the regulation of said valve member.

9. In a water heater regulator, the combination of a valve casing having a valve seat therein, a valve member cooperating with said seat, a threaded member on which said valve member is rotatably mounted and axially adjustable, an expansible and collapsible vessel operatively connected to said threaded member, a tube connected to said vessel and extending exteriorly of said casing, a bulb connected to said tube, said bulb, tube and vessel being charged with an expansible liquid and said vessel and tube being directly subjected to the hot water flowing through said casing whereby said liquid is maintained in its expanded condition in said vessel and tube by the hot water flowing through said casing and fluctuations of temperature at said bulb cause expansion and contraction of said liquid therein and sensitively effect the regulation of said valve member, and means slidably engaging said valve member and extending to the exterior of the casing at the opposite end thereof from said bulb for rotating said valve member on said threaded member to advance or retard the engagement of said valve member with its seat for any given condition of expansion of said vessel.

10. In a water regulator, in combination with a storage tank having inlets for hot and cold water disposed adjacent one end thereof and delivering said hot and cold water in streams at substantially right angles to each other and a hot water outlet at the opposite end of said tank, a valve member cooperating with said seat, a threaded member on which said valve member is rotatably mounted and axially adjustable, an expansible and collapsible vessel operatively connected to said threaded member, a tube connected to said vessel and extending exteriorly of said casing, a bulb connected to said tube and subjected to said streams within said tank, said bulb, tube and vessel being charged with an expansible liquid and said vessel and tube being directly subjected to the hot water flowing through said casing whereby said liquid is maintained in its expanded condition in said vessel and tube by the hot water flowing through said casing and fluctuations of temperature at said bulb cause expansion and contraction of said liquid therein and sensitively effect the regulation of said valve member, and means slidably engaging said valve member and extending to the exterior of the casing at the opposite end thereof from said bulb for rotating said valve member on said threaded member to advance or retard the engagement of said valve member with its seat for any given condition of expansion of said vessel.

JOHN E. DUBE.